United States Patent  
Aoki et al.

(10) Patent No.: US 7,608,972 B2
(45) Date of Patent: Oct. 27, 2009

(54) CLAW-POLE MOTOR HAVING SMALLER INTERVALS BETWEEN INDUCTION POLES OF STATOR RINGS AT BOTH ENDS

(75) Inventors: Shin Aoki, Kawachi-gun (JP); Nobuyuki Imai, Utsunomiya (JP); Tadanobu Takahashi, Kawachi-gun (JP); Daijiro Takizawa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 408 days.

(21) Appl. No.: 11/541,525

(22) Filed: Oct. 3, 2006

(65) Prior Publication Data

US 2007/0090720 A1 Apr. 26, 2007

(30) Foreign Application Priority Data

Oct. 21, 2005 (JP) .............................. 2005-306800

(51) Int. Cl.
  *H02K 1/12* (2006.01)
  *H02K 21/14* (2006.01)
(52) U.S. Cl. ................. 310/257; 310/49 R; 310/156.45; 310/156.53
(58) Field of Classification Search ............... 310/49 R, 310/257, 156.53, 156.45
  See application file for complete search history.

(56) References Cited

U.S. PATENT DOCUMENTS 6,545,376 B2 * 4/2003 Ohnishi et al. ............. 310/49 R
6,552,451 B1 * 4/2003 Ikegami et al. ............. 310/49 R
6,885,127 B1 * 4/2005 Higashino et al. ........... 310/254
6,946,771 B2 * 9/2005 Cros et al. .................. 310/257
7,135,802 B2 * 11/2006 Seki et al. ................... 310/257

FOREIGN PATENT DOCUMENTS

JP 2005-117743 A 4/2005
JP 2005117743 A * 4/2005

\* cited by examiner

*Primary Examiner*—Burton Mullins
(74) *Attorney, Agent, or Firm*—Arent Fox LLP

(57) ABSTRACT

A claw-pole motor includes a rotor having permanent magnets; and a stator having stator rings assigned to three phases, which are coaxially stacked along the same axis. Winding attachment portions are formed between adjacent stator rings, and an annular winding is installed in each winding attachment portion for generating a magnetic field for rotating the rotor. Each stator ring has a main body and claw-shaped induction poles which protrude from the main body in radial directions. The claw-shaped induction poles of the three phases are serially arranged along a circumference of the stator rings and also face the permanent magnets. An interval between adjacent claw-shaped induction poles along the circumference of predetermined two of the stator rings of the three phases is smaller than an interval between adjacent claw-shaped induction poles along the circumference of any other pair of the stator rings.

4 Claims, 11 Drawing Sheets

(Kb > Ka > Kc)

(Kb＞Ka＞Kc)

CLAW-POLE MOTOR HAVING SMALLER INTERVALS BETWEEN INDUCTION POLES OF STATOR RINGS AT BOTH ENDS

BACKGROUND OF THE INVENTION

1. Field of the Invention

The present invention relates to a claw-pole motor.

Priority is claimed on Japanese Patent Application No. 2005-306800, filed Oct. 21, 2005, the content of which is incorporated herein by reference.

2. Description of the Related Art

In an example of known claw-pole motors, stator rings assigned to a plurality of phases are stacked along their common axis, annular windings are installed in winding attachment holes which have an annular form and are formed between adjacent stator rings along the axis, and claw-shaped induction poles protruding inward or outward in radial directions are provided at the stator ring of each phase. The induction poles assigned to each phase are sequentially arranged along the circumference of the stator rings and also face an outer (or inner) peripheral face of a rotor, so as to commonly use the magnetic path of each phase without varying the flux linkage of each phase (see Japanese Unexamined Patent Application, First Publication No. 2005-117743).

In the above example of the claw-pole motor, magnetic resistance between two phases corresponding to the stator rings which are arranged at both ends along the axis is larger than the magnetic resistance between any other two phases, thereby producing inconsistency in inductance of each phase. If the electric current of each phase has a phase shift due to such inconsistency in inductance, the power factor and the torque constant of the motor are degraded in normal vector control which has a premise that the phase difference between the electric currents of adjacent phases is defined as "$2\pi/3=120$ degrees."

With respect to the above problem, in order to perform drive control of the claw-pole motor after correcting the phase shift due to the inconsistency in the inductance of each phase and making the amplitude and phase of the current of each phase consistent, a specific control device for executing complex control processes is necessary, which reduces flexibility of the control device to be widely used.

SUMMARY OF THE INVENTION

In light of the above circumstances, an object of the present invention is to provide a claw-pole motor which can be easily and appropriately controlled.

Therefore, the present invention provides a claw-pole motor comprising:

a rotor (e.g., a rotor 17 in an embodiment explained later) having permanent magnets (e.g., permanent magnets 18 in the embodiment); and a stator (e.g., a stator 19 in the embodiment) having stator rings (e.g., stator rings 31, 32, and 33 in the embodiment) respectively assigned to three phases, which are coaxially stacked along the same axis, wherein winding attachment portions are formed between adjacent stator rings, and an annular winding (e.g., annular windings 34, 35A, 35B, and 36 in the embodiment) is installed in each winding attachment portion for generating a magnetic field for rotating the rotor;

each stator ring has a main body and claw-shaped induction poles (e.g., claw-shaped induction poles 42, 52, and 62 in the embodiment) which protrude from the main body in radial directions;

the claw-shaped induction poles of the three phases are serially arranged along a circumference of the stator rings and also face the permanent magnets; and an interval (e.g., an interval Kc in the embodiment) between adjacent claw-shaped induction poles along the circumference of predetermined two (e.g., the U-phase stator rings 31 and the W-phase stator ring 33 in the embodiment) of the stator rings of the three phases is smaller than an interval (e.g., an interval Kb in the embodiment) between adjacent claw-shaped induction poles along the circumference of any other pair of the stator rings.

In accordance with the above claw-pole motor, the interval between adjacent claw-shaped induction poles along the circumference of predetermined two of the stator rings of the three phases is smaller than an interval between adjacent claw-shaped induction poles along the circumference of any other pair of the stator rings, so that the inductance of each phase can be consistent. Therefore, the drive of the claw-pole motor can be easily and appropriately controlled by usual vector control.

Typically, the stator rings provided at both ends along the axis have an identical form. Accordingly, it is possible to reduce the cost necessary for implementing the structure of the claw-pole motor.

In a preferable example:

a length (e.g., a thickness La in the embodiment) of each permanent magnet along the axis is smaller than an effective axial length (e.g., an effective axial length Lb in the embodiment) of the claw-shaped induction poles of the three phases along the axis, which are provided at the stator;

the rotor has an opposed part (e.g., an opposed part 72 in the embodiment) which is positioned between the permanent magnets and the claw-shaped induction poles of the three phases so as to face the claw-shaped induction poles; and a length of the opposed part along the axis is equal to or greater than the length of each permanent magnet along the axis, and is also equal to or smaller than the effective axial length of the claw-shaped induction poles of the three phases.

In comparison with an assumed case of employing a setting in which the length of each permanent magnet along the axis is identical to the effective axial length of the claw-shaped induction poles of the three phases, the above claw-pole motor has the length of each permanent magnet along the axis, which is smaller than the effective axial length of the claw-shaped induction poles of the three phases. Therefore, the length along the circumference or the thickness along the radial direction of each permanent magnet may be increased so as to reduce the weight of the rotor (in comparison with the assumed case) without varying the amount of magnetic flux of the magnetic field between the permanent magnets of the rotor and the claw-shaped induction poles of the stator.

In a typical example, the predetermined two of the stator rings are provided at both ends along the axis. In this case, the interval between the adjacent claw-shaped induction poles along the circumference of any adjacent stator rings may be identical.

DETAILED DESCRIPTION OF THE INVENTION

Hereinafter, an embodiment of the claw-pole motor in accordance with the present invention will be described with reference to the appended figures.

Figure 1:
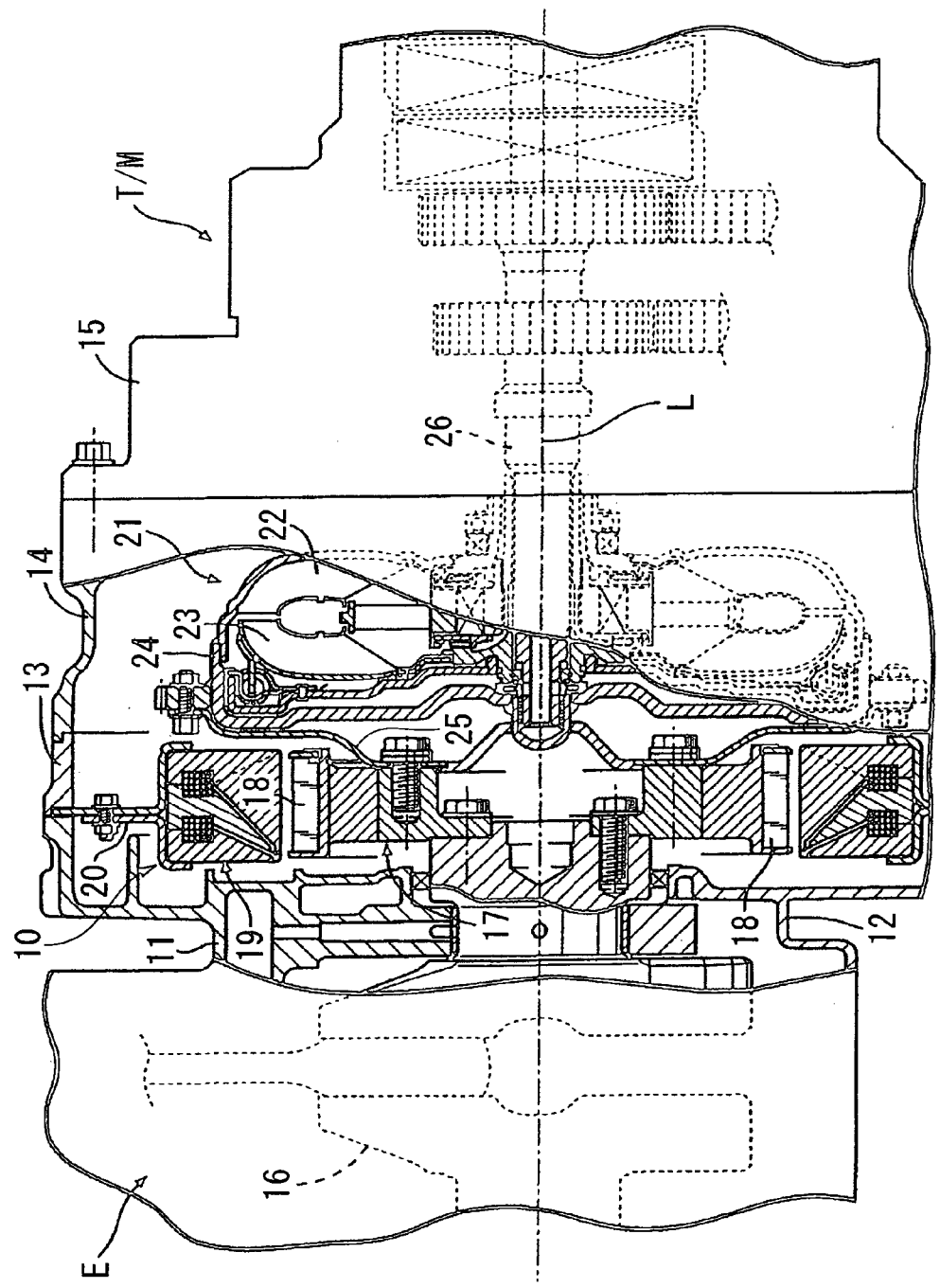
FIG. 1 is a diagram showing the structure of a power unit of a hybrid vehicle in which a claw-pole motor as an embodiment of the present invention is installed.

As shown in FIG. 1, a claw-pole motor 10 of the present embodiment may be installed in a hybrid vehicle as a driving source together with an internal combustion engine E, and more specifically, in a parallel hybrid vehicle so as to implement a structure in which the internal combustion engine E, the claw-pole motor 10, and a transmission "T/M" are directly and serially coupled with each other. In this structure, at least one driving force of the internal combustion engine E and the claw-pole motor 10 is transmitted to driving wheels of the vehicle.

When a driving force is transmitted from the driving wheels to the claw-pole motor during deceleration, the claw-pole motor 10 functions as an electric generator and generates so-called regenerative driving force, so that kinetic energy of the vehicle body is recovered and stored as electric (or regenerative) energy. Also when the power output from the internal combustion engine E is transmitted to the claw-pole motor 10, the claw-pole motor 10 functions as the electric generator and thus generates electric energy.

In this hybrid vehicle, a motor case 13, a torque converter case 14, and a transmission case 15 are joined to an end face of a cylinder block 11 and an end face of a crank case 12 of the engine E, and a rotor 17 of the claw-pole motor 10 is fastened to an end of a crank shaft 16 which is supported between the cylinder block 11 and the crank case 12. A plurality of permanent magnets 18 are attached to the outer periphery of the rotor 17, and an annular stator 19 faces the permanent magnets 18 via a specific air gap. A stator holder 20 for supporting the stator 19 is fixed between faces of the cylinder block 11 and the motor case 13 (which face each other) and also between faces of the crank case 12 and the motor case 13 (which also face each other).

A torque converter 21 contained in the torque converter case 14 has a turbine runner 22 and a pump impeller 23. A side cover 24, which is joined to the turbine runner 22 and covers the pump impeller 23, is connected via a drive plate 25 to the rotor 17 of the claw-pole motor 10. The pump impeller 23 of the torque converter 21 is coupled to an end of a main shaft 26 which is supported by the transmission case 15.

Figure 2:
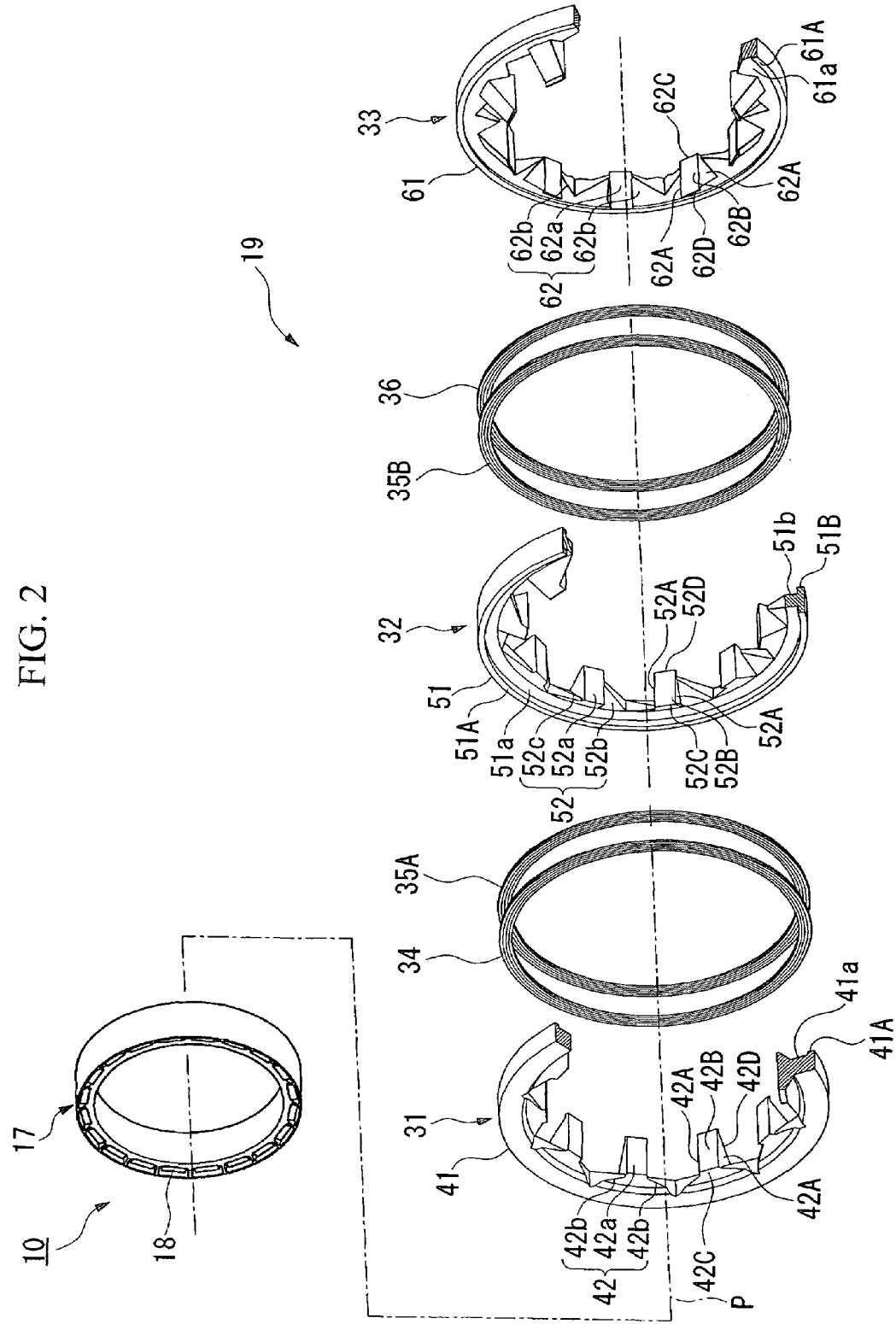
FIG. 2 is an exploded perspective view of the claw-pole motor of the embodiment.

As shown in FIG. 2, the claw-pole motor 10 of the present embodiment may include the rotor 17 having the plurality of the permanent magnets 18, and the stator 19 has a plurality of phases (e.g., three phases such as a U-phase, V-phase, and W-phase) so as to generate a rotating magnetic field for rotating the rotor 17. One end of the rotating shaft of the rotor 17 is coupled to the crank shaft 16 of the internal combustion engine E, and the other end is connected to the main shaft 26 of the transmission T/M.

As shown in FIG. 2, the stator 19 may have a U-phase stator ring 31, a V-phase stator ring 32, a W-phase stator ring 33, a U-phase winding 34, a first V-phase winding 35A, a second V-phase winding 35B, and a W-phase winding 36. The stator rings 31, 32 and 33 respectively have back yokes 41, 51, and 61 and claw-shaped induction poles 42, 52, and 62, where the yoke and the claw-shaped induction poles of each stator are integrally molded by pressure molding using a powder-type magnetic material.

More specifically, the U-phase stator ring 31 has the U-phase back yoke 41 having a substantially annular shape, and U-phase claw-shaped induction poles 42 provided at regular intervals along the inner periphery of the U-phase back yoke 41. The induction poles 42 protrude inward along radial directions and also gradually protrude toward one direction along the axis P.

The U-phase back yoke 41 has an end face 41A which faces an end face 51A of the V-phase back yoke 51, and a U-phase winding attachment part 41a is formed in the end face 41A. The U-phase winding attachment part 41a has an annular shape with respect to the same axis P and is recessed along a circumference; thus, in the U-phase back yoke 41, this part is thinner than the other parts along the axis P.

Each U-phase claw-shaped induction pole 42 may include: a U-phase induction pole main body 42a having (i) a substantially L-shaped section with respect to the circumferential direction and (ii) a substantially rectangular section with respect to the radial direction; and U-phase extensions 42b protruding along the circumference of the U-phase back yoke 41 from both side faces 42A of the U-phase induction pole main body 42a. The U-phase extensions 42b also protrude inward from the inner face of the U-phase back yoke 41 along the radial directions thereof, so that the U-phase extensions 42b are joined to the side faces 42A of the U-phase induction pole main body 42a and the inner face of the U-phase back yoke 41. In addition, in each U-phase extension 42b, the further from the base end toward the head, the smaller the thickness is.

The U-phase induction pole main body 42a has a pair of the side faces 42A connected perpendicularly to a U-phase opposed face 42B which faces the outer-peripheral face of the corresponding permanent magnet 18 of the rotor 17, and also has a pair (along the axis P) of an end face 42C and an inclined face 42D. The end face 42C is substantially perpendicular to the U-phase opposed face 42B, and the inclined face 42D extends inward in the radial direction while inclining so that the distance from the end face 42C is gradually increased.

The V-phase stator ring 32 has the V-phase back yoke 51 which has a substantially annular shape, and V-phase claw-shaped induction poles 52 provided at regular intervals along the inner periphery of the V-phase back yoke 51. The induction poles 52 protrude inward along radial directions and also extend toward both directions along the axis P. That is, each claw-shaped induction pole 52 has a claw form protruding toward both directions along the axis P.

In the end face 51A of the V-phase back yoke 51, which faces the end face 41A of the U-phase back yoke 41, a first V-phase winding attachment part 51a is formed, which has an annular shape with respect to the same axis P and is recessed along a circumference; thus, in the V-phase back yoke 51, this part is thinner than the other parts along the axis P. In addition, V-phase back yoke 51 has the other end face 51B which faces an end face 61A of the W-phase back yoke 61, and a second V-phase winding attachment part 51b is formed in the end face 51B. The second V-phase winding attachment part 51b also has an annular shape with respect to the same axis P and is recessed along the circumference; thus, in V-phase back yoke 51, this part is thinner than the other parts along the axis P.

The V-phase claw-shaped induction poles 52 may include: a V-phase induction pole main body 52a having (i) a substantially T-shaped section with respect to the circumferential direction and (ii) a substantially rectangular section with respect to the radial direction; and a first V-phase extension 52b and a second V-phase extension 52c which protrude along the circumference of the V-phase back yoke 51 from both side faces 52A of the V-phase induction pole main body 52a. The V-phase extensions 52b and 52c also protrude inward from the inner face of the V-phase back yoke 51 along the radial directions thereof, so that the V-phase extensions 52b and 52c are joined to the side faces 52A of the V-phase induction pole main body 52a and the inner face of the V-phase back yoke 51. In addition, in each of the V-phase extensions 52b and 52c, the further from the base end toward the head, the smaller the thickness is.

The V-phase induction pole main body 52a has a pair of the side faces 52A connected perpendicularly to a V-phase opposed face 52B which faces the outer-peripheral face of the corresponding permanent magnet 18 of the rotor 17, and also has a pair (along the axis P) of one inclined face 52C and the other inclined face 52D. The end faces 52C and inclined face 52D extend inward in the radial direction while inclining so that the distance therebetween is gradually increased.

The W-phase stator ring 33 has a shape similar to that of the U-phase stator ring 31, and thus has the W-phase back yoke 61 having a substantially annular shape, and W-phase claw-shaped induction poles 62 provided at regular intervals along the inner periphery of the W-phase back yoke 61. The induction poles 62 protrude inward along radial directions and also gradually protrude toward the other direction along the axis P.

In the end face 61A of the W-phase back yoke 61, which faces the other end face 51B of the V-phase back yoke 51, a W-phase winding attachment part 61a is formed, which has an annular shape with respect to the same axis P and is recessed along a circumference; thus, in the W-phase back yoke 61, this part is thinner than the other parts along the axis P.

The W-phase claw-shaped induction poles 62 may include: a W-phase induction pole main body 62a having (i) a substantially L-shaped section with respect to the circumferential direction and (ii) a substantially rectangular section with respect to the radial direction; and W-phase extensions 62b protruding along the circumference of the W-phase back yoke 61 from both side faces 62A of the W-phase induction pole main body 62a. The W-phase extensions 62b also protrude inward from the inner face of the W-phase back yoke 62 along the radial directions thereof, so that the W-phase extensions 62b are joined to the side faces 62A of the W-phase induction pole main body 62a and the inner face of the W-phase back yoke 61. In addition, in each W-phase extension 62b, the further from the base end toward the head, the smaller the thickness is.

The W-phase induction pole main body 62a has a pair of the side faces 62A connected perpendicularly to a W-phase opposed face 62B which faces the outer-peripheral face of the corresponding permanent magnet 18 of the rotor 17, and also has a pair (along the axis P) of an end face 62C and an inclined face 62D. The end face 62C is substantially perpendicular to the W-phase opposed face 62B, and the inclined face 62D extends inward in the radial direction while inclining so that the distance from the end face 62C is gradually increased.

Figure 3A:
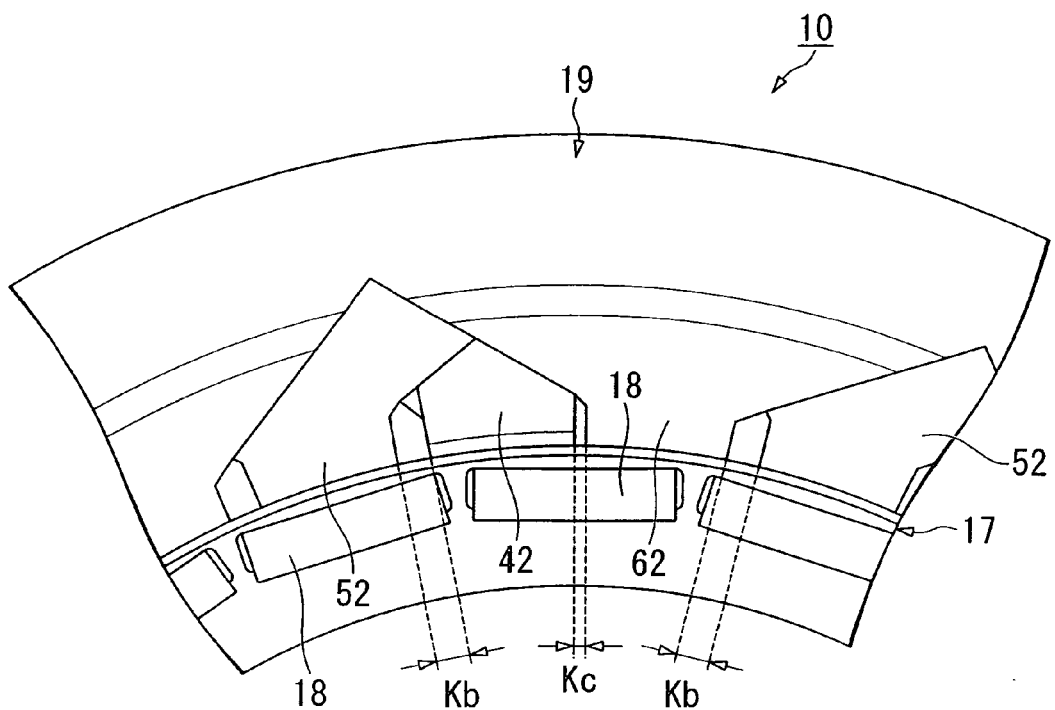
FIG. 3A is a plan view of a main portion of the claw-pole motor of the embodiment, viewed along the axis P.
Figure 3B:
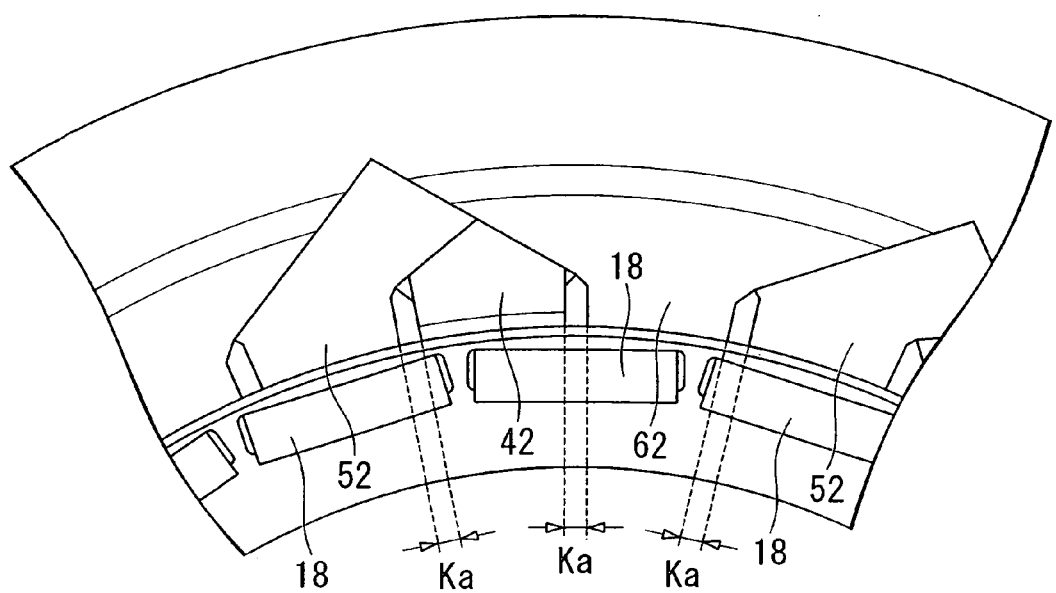
FIG. 3B is a plan view of a main portion of a claw-pole motor of a comparative example, viewed along the axis P, in which the same interval is set between all adjacent claw-shaped induction poles along the circumference.

As shown in FIGS. 3A and 3B, the stator rings 31, 32, and 33 are connected with each other in a manner such that the claw-shaped induction poles 42, 52, and 62 are serially arranged (specifically, in sequential order of 52, 42, and 62). The end face 41A of the U-phase back yoke 41 and one end face 51A of the V-phase back yoke 51 contact each other so that the U-phase winding attachment part 41a in the end face 41A and the first V-phase winding attachment part 51a in said one end face 51A form a first winding attachment portion. Simultaneously, the other end face 51B of the V-phase back yoke 51 and the end face 61A of the W-phase back yoke 61 contact each other so that the second V-phase winding attachment part 51b in the other end face 51B and the W-phase winding attachment part 61a in the end face 61A form a second winding attachment portion.

In the first winding attachment portion, (i) the U-phase winding 34 is installed at a position toward the U-phase back yoke 41, and (ii) the first V-phase winding 35A is installed at a position toward the V-phase back yoke 51, along the axis P. Similarly, in the second winding attachment portion, (i) the second V-phase winding 35B is installed at a position toward the V-phase back yoke 51, and (ii) the W-phase winding 36 is installed at a position toward the W-phase back yoke 61, along the axis P.

The windings 34, 35A, 35B, and 36 are each formed by winding a flat type conductive wire having a substantially rectangular section so as to form a plurality of wire layers both in radial and axial directions. In addition, (i) the U-phase winding 34 and the first V-phase winding 35A installed in the first winding attachment portion respectively have magnetomotive forces acting in opposite directions, (ii) the second V-phase winding 35B and the W-phase winding 36 installed in the second winding attachment portion respectively have magnetomotive forces acting in opposite directions, and (iii) the magnetomotive forces of the first V-phase winding 35A and the second V-phase winding 35B also act in opposite directions. Accordingly, the directions of the magnetomotive forces of the windings 34, 35A, 35B, and 36, which are arranged in turn along the axis P, are inverted alternately.

In addition, the windings 34, 35A, 35B, and 36 are connected with each other using a star or delta connection form.

The U-phase induction pole main body 42a of each U-phase claw-shaped induction pole 42 faces the first V-phase extension 52b of the corresponding V-phase claw-shaped induction pole 52 via a specific gap along the axis P, and the first V-phase extension 52b of each V-phase claw-shaped induction pole 52 faces the W-phase extension 62b of the corresponding W-phase claw-shaped induction pole 62 via a specific gap along the axis P.

The V-phase induction pole main body 52a of each V-phase claw-shaped induction pole 52 faces (i) the U-phase extension 42b of the corresponding U-phase claw-shaped induction pole 42 via a specific gap along the axis P, and also (ii) the W-phase extension 62b of the corresponding W-phase claw-shaped induction pole 62 via a specific gap along the axis P.

The W-phase induction pole main body 62a of each W-phase claw-shaped induction pole 62 faces the second V-phase extension 52c of the corresponding V-phase claw-shaped induction pole 52 via a specific gap along the axis P, and the second V-phase extension 52c of each V-phase claw-shaped induction pole 52 faces the U-phase extension 42b of the corresponding U-phase claw-shaped induction pole 42 via a specific gap along the axis P.

Figure 4:
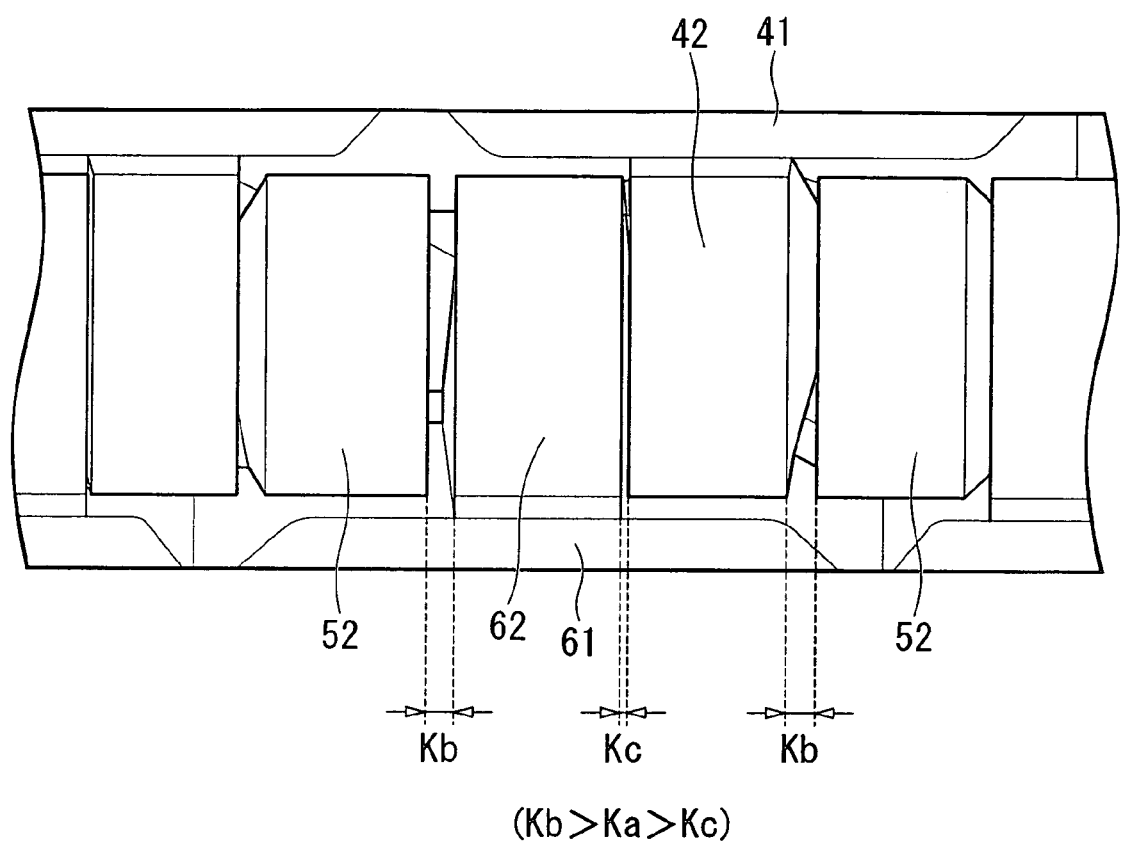
FIG. 4 is a plan view of a main portion of the stator of the claw-pole motor of the embodiment, viewed along a radial direction.

As shown in FIGS. 3A and 4, regarding the claw-shaped induction poles 42, 52, and 62 which are serially arranged along the circumference around the axis P, interval Kc between adjacent claw-shaped induction poles 42 and 62 (along the circumference) of the two stator rings at both ends along the axis P, that is, the U-phase stator ring 31 and the W-phase stator ring 33 is smaller than interval Kb between adjacent claw-shaped induction poles 42 and 52 along the circumference, and also between adjacent claw-shaped induction poles 52 and 62 along the circumference.

Figure 5:
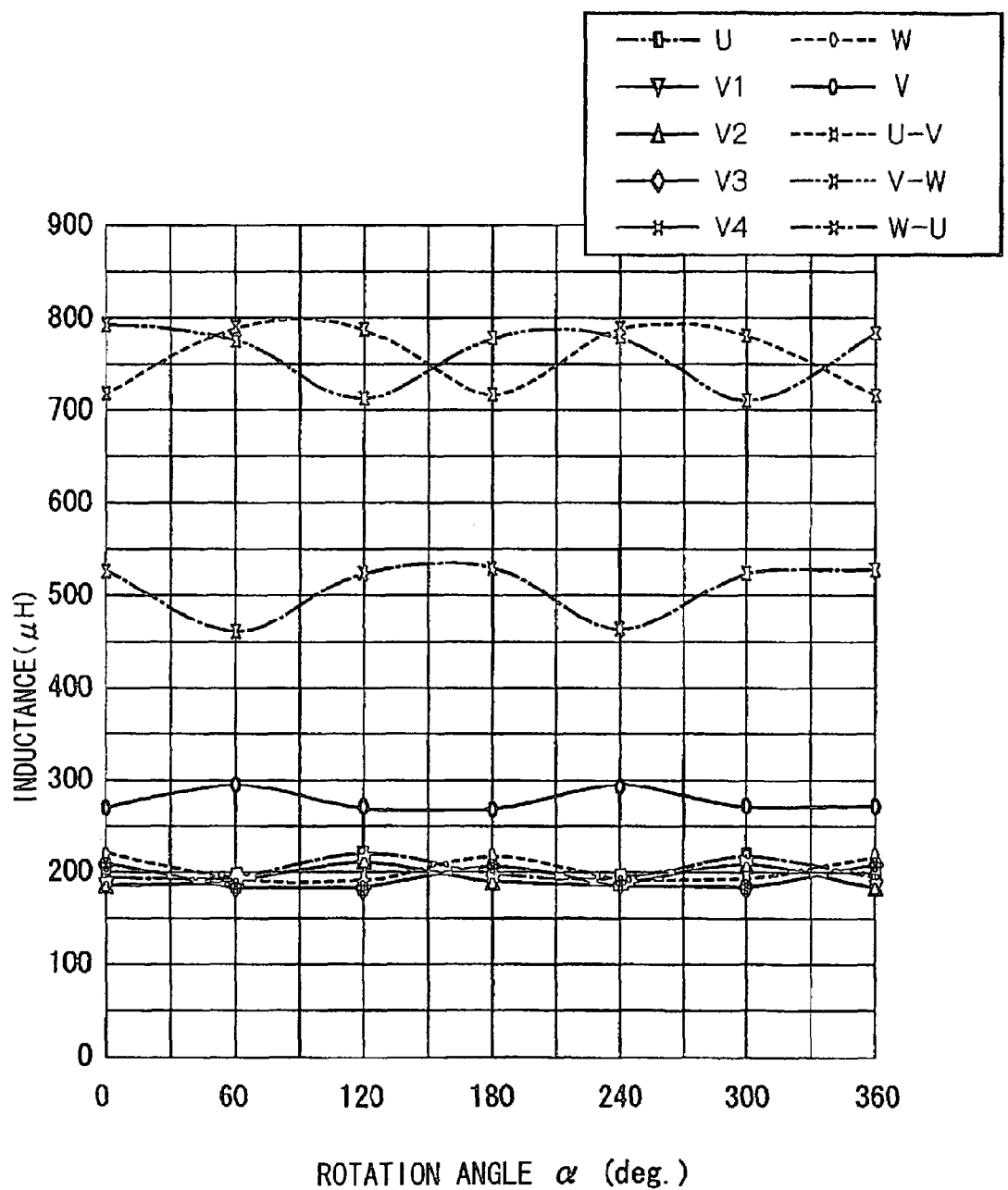
FIG. 5 shows variations in inductances with respect to the rotation angle of the rotor in the comparative example.

FIG. 3B shows a comparative example in which, regarding the claw-shaped induction poles 42, 52, and 62 which are serially arranged along the circumference around the axis P, the same interval Ka is set between adjacent claw-shaped induction poles 42 and 52, between adjacent claw-shaped induction poles 52 and 62, and between adjacent claw-shaped induction poles 42 and 62, along the circumference. In this comparative example, the magnetic resistance between the U-phase and the W-phase is larger than the magnetic resistance between the U-phase and the V-phase, or between the V-phase and the W-phase. With respect to this comparative example, FIG. 5 shows variations in the following inductances with respect to the rotation angle α of the rotor 17: (i) U-phase inductance "U" and W-phase inductance "W" which respectively correspond to the U-phase winding 34 and the W-phase winding 36, (ii) V-phase inductances "V1" and "V2", each of which corresponds to the first V-phase winding 35A, and V-phase inductances "V3" and "V4", each of which corresponds to the second V-phase winding 35B, (iii) V-phase synthetic inductance "V", and (iv) mutual inductances "U-V" between the U-phase and V-phase, "V-W" between the V-phase and W-phase, and "W-U" between the W-phase and U-phase.

As shown in FIG. 5, the self inductance of the V-phase (i.e., the above synthetic inductance V) is larger than the self inductances of the U-phase and the W-phase, and the mutual inductances between the V-phase and the other phases are larger than the mutual inductance between the U-phase and W-phase.

Figure 6:
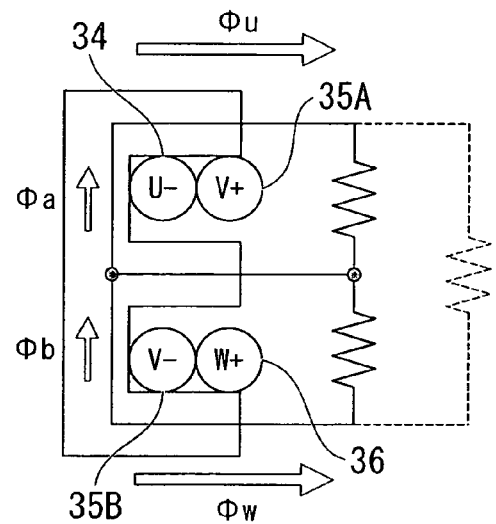
FIG. 6 shows an equivalent circuit of the stator of the claw-pole motor with respect to leakage flux thereof, in the embodiment.
Figure 7:
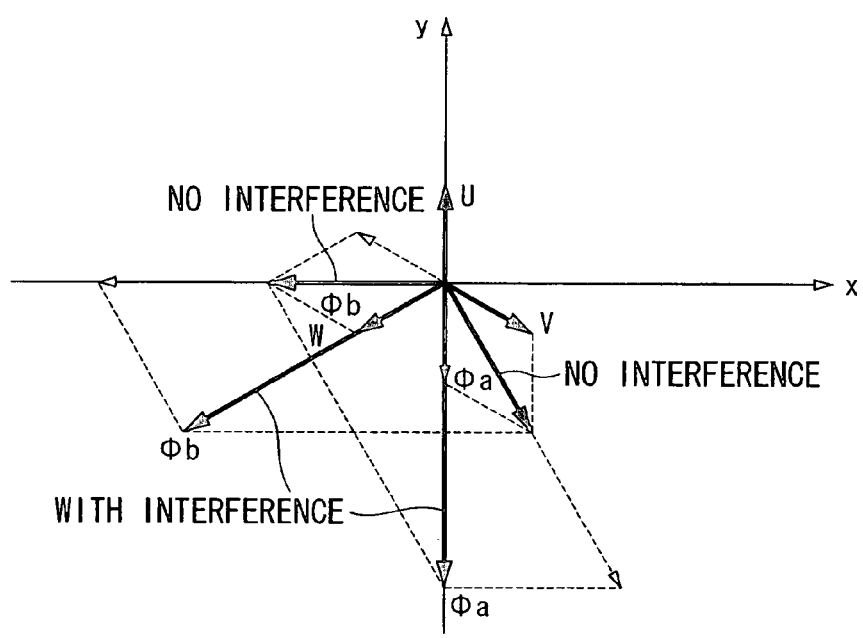
FIG. 7 is a diagram showing a relationship between magnetomotive force Φa of windings installed in the first winding attachment portion and magnetomotive force Φb of windings installed in the second winding attachment portion, in the claw-pole motor with respect to the embodiment and the comparative example.
Figure 8:
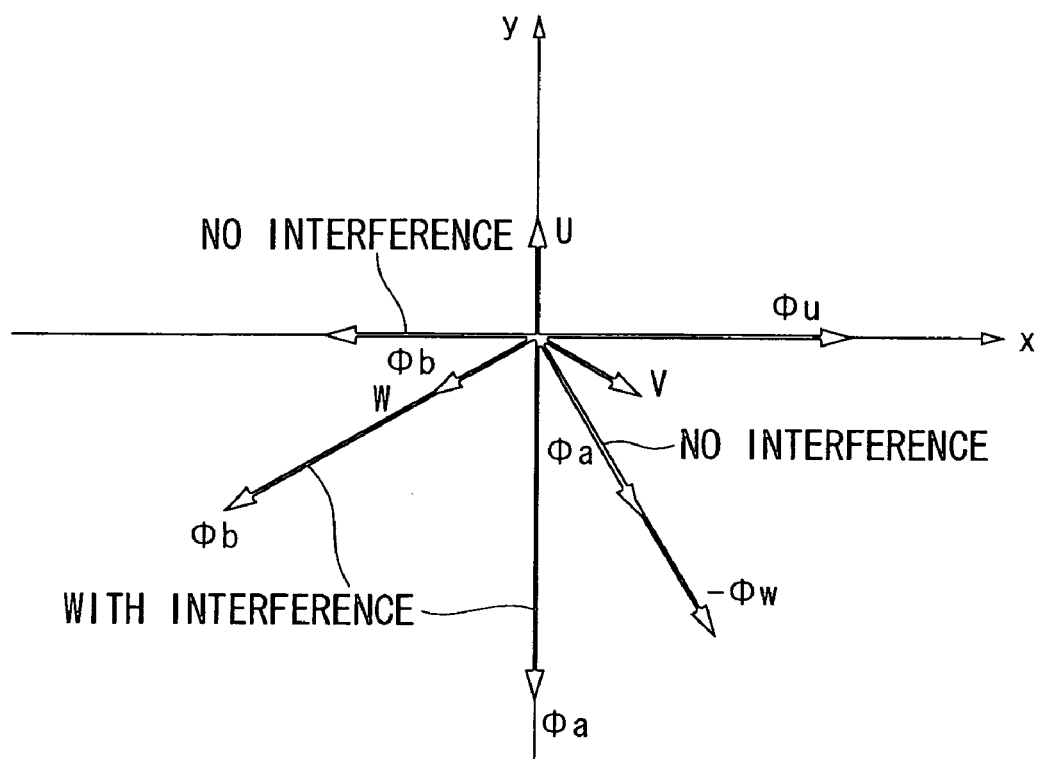
FIG. 8 is a diagram showing a relationship between the magnetomotive forces Φa and Φb, and magnetic fluxes Φu and Φw of the permanent magnets, which respectively flow through the claw-shaped induction poles of the U-phase stator ring and the W-phase stator ring which are provided at both ends along the axis P, in the claw-pole motor with respect to the embodiment and the comparative example.

FIG. 6 shows an equivalent circuit of the stator 19 with respect to leakage flux thereof. In FIG. 6, reference symbol Φa indicates magnetomotive force of the windings 34 and 35A installed in the first winding attachment portion, and reference symbol Φb indicates magnetomotive force of the windings 35B and 36 installed in the second winding attachment portion. The magnetomotive force Φa is obtained by synthesizing magnetomotive forces of the windings 34 and 35A, and the magnetomotive force Φb is obtained by synthesizing magnetomotive forces of the windings 35B and 36. When the magnetic resistance between the U-phase and W-phase is relatively large, it can be regarded that there is no interference of leakage flux between these phases. In contrast, when each magnetic resistance between the phases is the same, such interference occurs. Between these cases of presence/absence of interference, the magnetomotive forces Φa and Φb change as shown in FIG. 7. FIG. 8 shows magnetic fluxes Φu and Φw of the permanent magnets 18, which respectively flow through the claw-shaped induction poles 42 and 62 of the U-phase stator ring 31 and the W-phase stator ring 33 which are provided at both ends along the axis P.

Figure 9A:
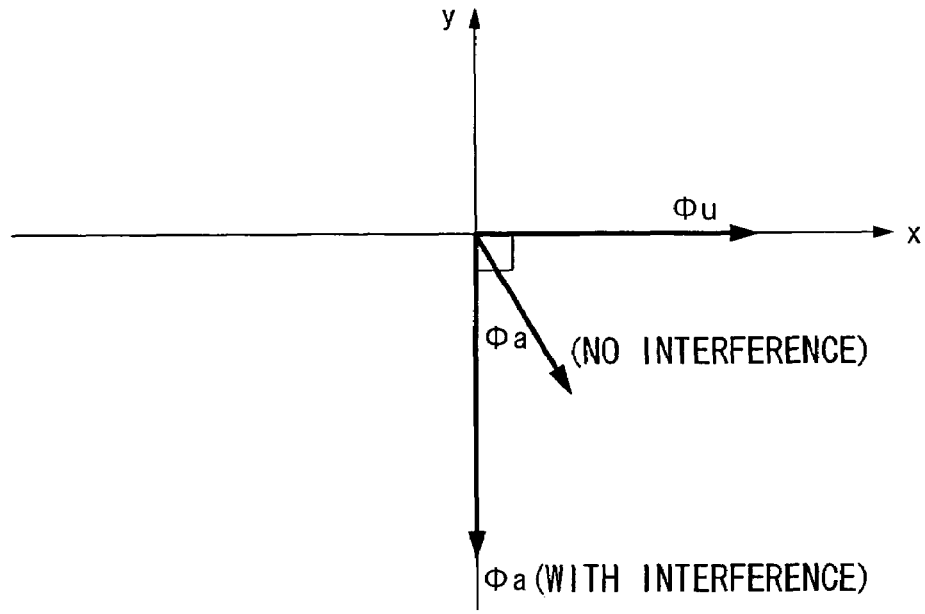
FIG. 9A is a diagram showing a relationship between the magnetomotive force Φa and the magnetic flux Φu.

Therefore, as shown in FIG. 9A, when there is the above-described interference (see "with interference"), the magnetomotive force Φa of the windings 34 and 35A and the magnetic flux Φu passing through the U-phase claw-shaped induction poles 42 are perpendicular to each other. In contrast, when there is no interference, the phase angle between the magnetomotive force Φa of the windings 34 and 35A and the magnetic flux Φu passing through the U-phase claw-shaped induction poles 42 is less than 90 degrees, thereby producing a magnetic field of higher strength in comparison with the magnetic field produced when the phase angle is 90 degrees.

Figure 9B:
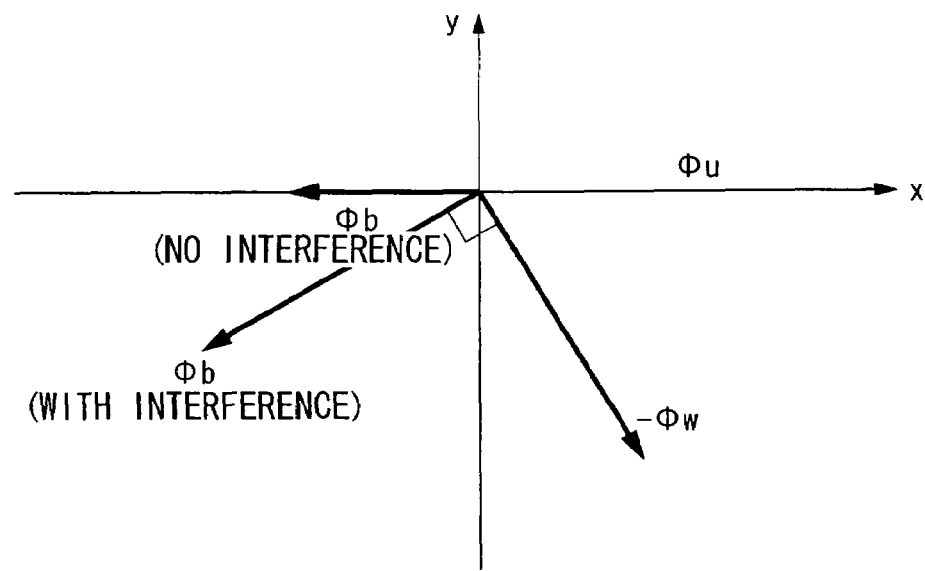
FIG. 9B is a diagram showing a relationship between the magnetomotive force Φb and the magnetic flux Φw, in the claw-pole motor with respect to the embodiment and the comparative example.

As also shown in FIG. 9B, when there is the above-described interference, the magnetomotive force Φb of the windings 35B and 36 and the magnetic flux Φu (i.e., "−Φu" in FIG. 9B) passing through the W-phase claw-shaped induction poles 62 are perpendicular to each other. In contrast, when there is no interference, the phase angle between the magnetomotive force Φb of the windings 35B and 36 and the magnetic flux Φu passing through the W-phase claw-shaped induction poles 62 is greater than 90 degrees, thereby producing a magnetic field of lower strength in comparison with the magnetic field produced when the phase angle is 90 degrees.

Therefore, when the magnetic resistance between the U-phase and W-phase is relatively large, the quantities of magnetic flux generated by each mutual inductance between the phases are not uniform, so that the magnetic flux generated by each winding and the magnetic flux generated by the permanent magnets 18 are not perpendicular to each other. Therefore, in comparison with the case when they are perpendicular to each other, when the motor is driven, the magnetic field due to the U-phase magnetic flux has higher strength, and the magnetic field due to the W-phase magnetic flux has lower strength, so that the U-phase magnetic flux is saturated and the power factor is lowered.

In contrast, as shown in FIGS. 3A and 4, when the interval Kc between adjacent claw-shaped induction poles 42 and 62 (along the circumference) of the two stator rings at both ends along the axis P, that is, the U-phase stator ring 31 and the W-phase stator ring 33 is smaller than the interval Kb between adjacent claw-shaped induction poles 42 and 52 along the circumference, and also between adjacent claw-shaped induction poles 52 and 62 along the circumference, and thus each magnetic resistance between the phases is identical, the inductance of each phase can be consistent. Therefore, the drive of the claw-pole motor 10 can be easily and appropriately controlled by usual vector control.

Figure 10:
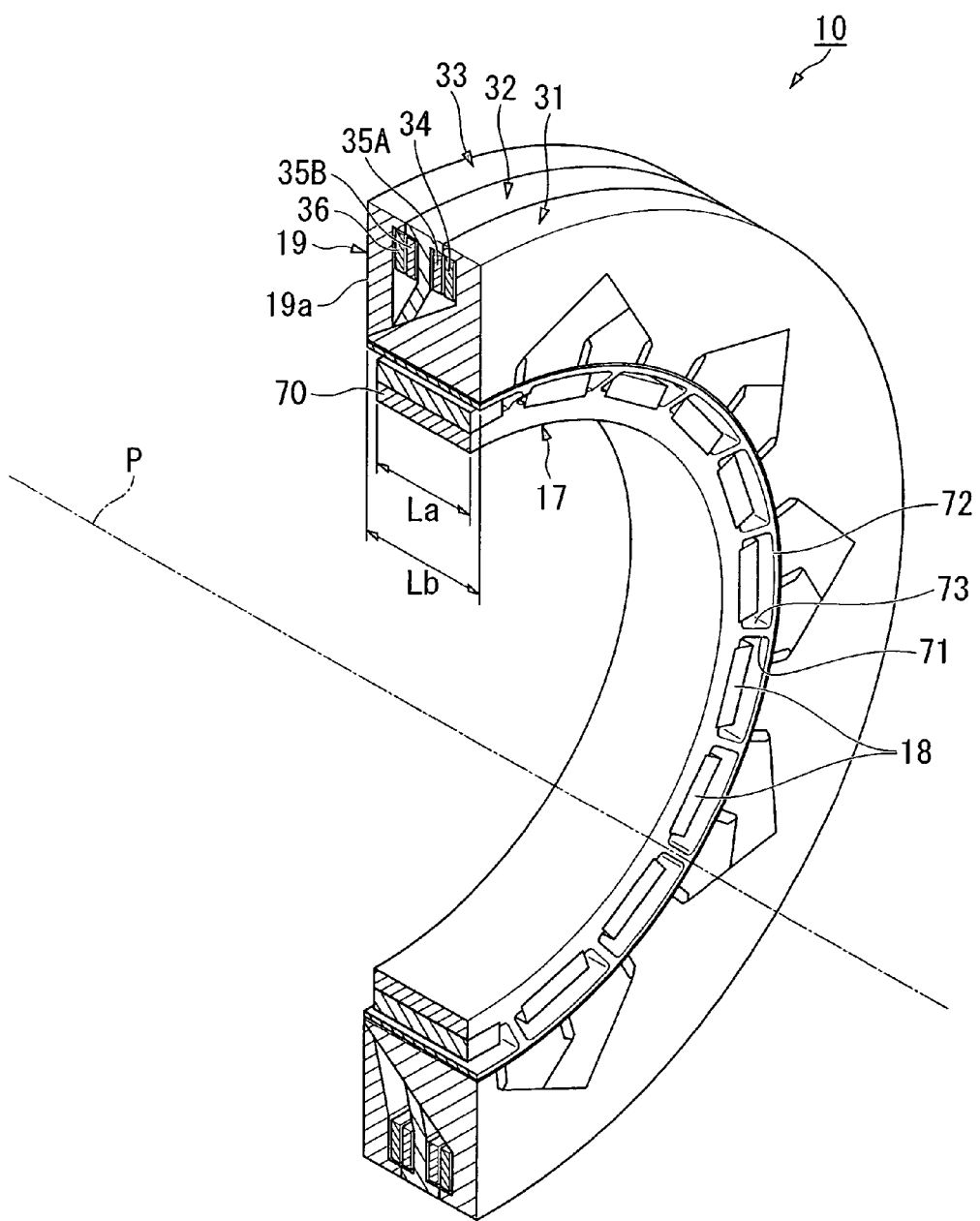
FIG. 10 is a broken perspective view of a main portion of the claw-pole motor of the embodiment.
Figure 11A:
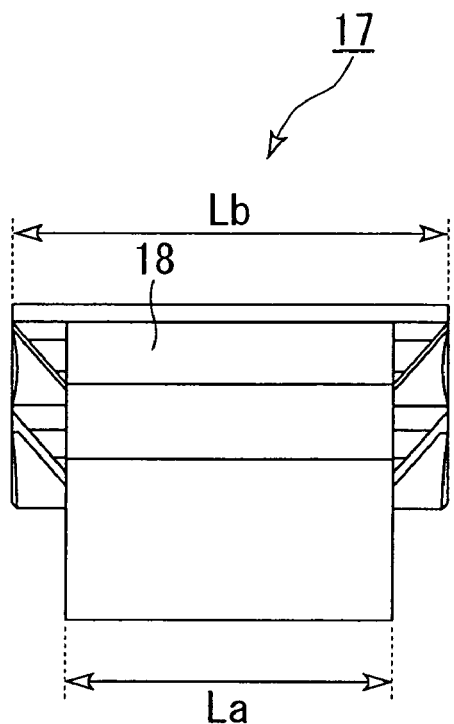
FIG. 11A is a sectional view of a main portion of the rotor with respect to the circumferential direction in the embodiment.
Figure 11B:
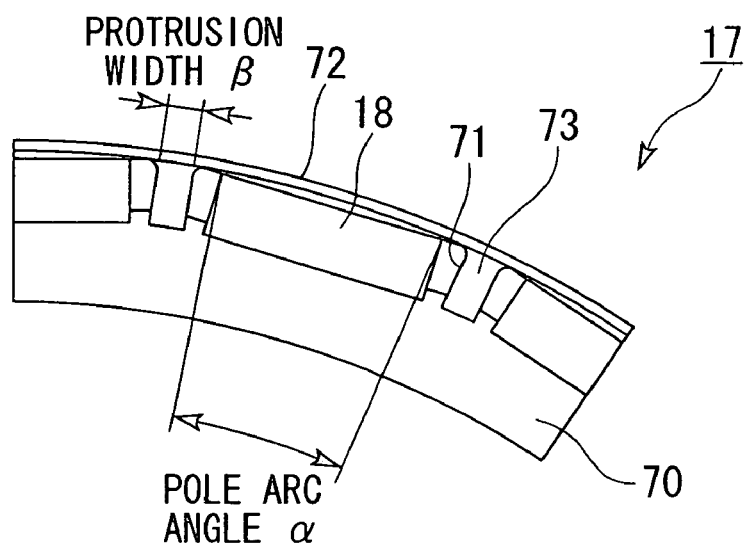
FIG. 11B is a plan view of a main portion of the rotor of the embodiment, viewed along the axis P.

As shown in FIGS. 10, 11A, and 11B, the rotor 17 is a permanent-magnet-type rotor using the permanent magnets 18 for generating a magnetic field. The rotor 17 has a rotor main body 70 in which a plurality of magnet attachment holes 71 are provided at regular intervals along a circumference in the vicinity of the outer periphery of the main body 70, where each magnet attachment hole 71 is a through hole extending along the axis P.

The permanent magnet 18 installed into each magnet attachment hole 71 may be magnetized in a radial direction in a manner such that any adjacent ones of the plurality of permanent magnets 18 provided at regular intervals along the circumference are magnetized in directions which are mutually opposite to each other, that is, one permanent magnet 18 having the N pole on the outer periphery is always adjacent to another permanent magnet 18 having the S pole on the outer periphery A stator main body 19a is formed by stacking and connecting the U-phase stator ring 31, the V-phase stator ring 32, and the W-phase stator ring 33 of the three phases along the axis P. The thickness La of each permanent magnet 18 along the axis P is smaller than the effective axial length Lb (along the axis P) of the claw-shaped induction poles 42, 52, and 62 of the three phases (i.e., La<Lb). At the outer periphery of the rotor main body 70, an opposed part 72 is provided, which faces the heads (at the inner periphery) of the claw-shaped induction poles 42, 52, and 62. The thickness of the opposed part 72 along the axis P is equal to or larger than the thickness La of the permanent magnets 18 along the axis P and also equal to or smaller than the effective axial length Lb of the claw-shaped induction poles 42, 52, and 62, and may be identical to Lb.

Between every adjacent magnet attachment hole 71 along the circumference, a rotor protruding portion 73 is formed. The thickness of each rotor protruding portion 73 along the axis P varies as the measurement position proceeds from the inner periphery to the outer periphery, in a manner such that the thickness gradually increases, for example, from La to Lb.

Figure 12:
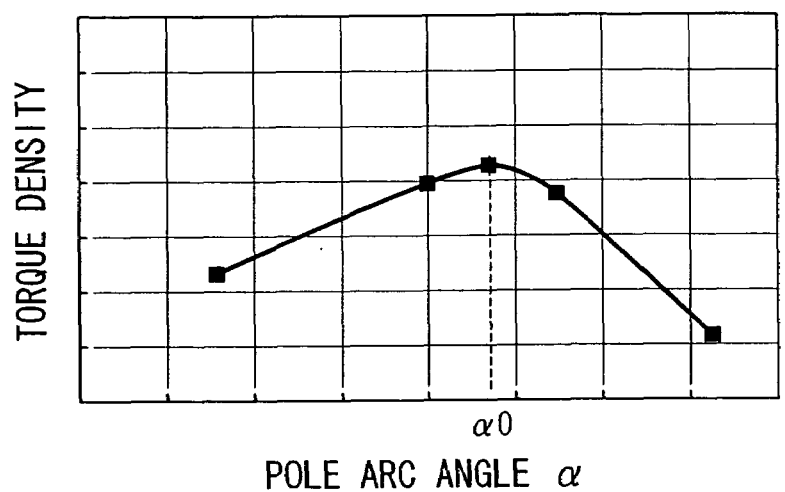
FIG. 12 is a graph showing a relationship between pole arc angle α and the torque density of the rotor of the embodiment.
Figure 13:
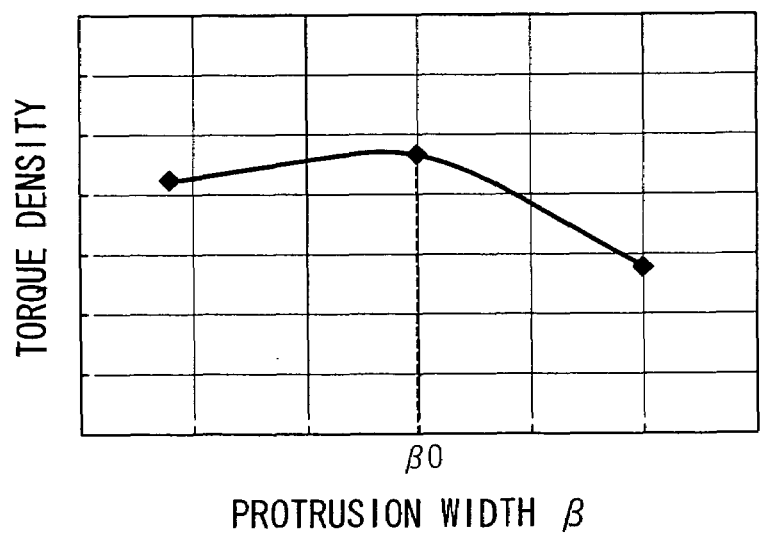
FIG. 13 is a graph showing a relationship between protrusion width β and the torque density of the rotor of the embodiment.

FIG. 11B shows a pole arc angle α corresponding to the length of each permanent magnet 18 along the relevant circumference, and a protrusion width β which is the length of each rotor protruding portion 73 along the circumference. As shown in FIGS. 12 and 13, the pole arc angle α and the protrusion width β are respectively set to appropriate values α0 and β0 which are each obtained at the maximum torque density.

In comparison with an assumed case of employing a setting in which the thickness of the permanent magnet 18 along the axis P is identical to the thickness of the stator main body 19a along the axis P, the claw-pole motor 10 of the present embodiment has the thickness La of the permanent magnet 18 along the axis P, which is smaller than the effective axial length Lb of the claw-shaped induction poles 42, 52, and 62 of the three phases. Therefore, the length along the circumference or the thickness along the radial direction of each permanent magnet 18 may be increased so as to reduce the weight of the rotor 17 (in comparison with the assumed case) without varying the amount of magnetic flux of the magnetic field between the permanent magnets 18 of the rotor 17 and the claw-shaped induction poles 42, 52, and 62 of the stator 19.

As described above, in accordance with the claw-pole motor 10 of the present embodiment, the interval Kc between adjacent claw-shaped induction poles 42 and 62 (along the circumference) of the two stator rings at both ends along the axis P, that is, the U-phase stator ring 31 and the W-phase stator ring 33 is smaller than the interval Kb between adjacent claw-shaped induction poles 42 and 52 along the circumference, and also between adjacent claw-shaped induction poles 52 and 62 along the circumference, so that the inductance of each phase can be consistent. Therefore, the drive of the claw-pole motor 10 can be easily and appropriately controlled by usual vector control.

In addition, the weight of the rotor 17 can be reduced without varying the amount of magnetic flux of the magnetic field between the permanent magnets 18 of the rotor 17 and the claw-shaped induction poles 42, 52, and 62 of the stator 19.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A claw-pole motor comprising:
   a rotor having permanent magnets; and
   a stator having stator rings respectively assigned to three phases, which are coaxially stacked along an axis, wherein
   winding attachment portions are formed between adjacent stator rings, and an annular winding is installed in each winding attachment portion for generating a magnetic field for rotating the rotor;
   each stator ring has a main body and claw-shaped induction poles which protrude from the main body in radial directions;
   the claw-shaped induction poles of the three phases are serially arranged along a circumference of the stator rings and also face the permanent magnets;
   an interval between adjacent claw-shaped induction poles along the circumference of predetermined two of the stator rings of the three phases is smaller than an interval between adjacent claw-shaped induction poles along the circumference of any other pair of the stator rings,
   a length of each permanent magnet along the axis is smaller than an effective axial length of the claw-shaped induction poles of the three phases along the axis, which are provided at the stator;
   the rotor has an opposed part which is positioned between the permanent magnets and the claw-shaped induction poles of the three phases and faces the claw-shaped induction poles; and
   a length of the opposed part along the axis is equal to or greater than the length of each permanent magnet along the axis, and is also equal to or smaller than the effective axial length of the claw-shaped induction roles of the three phases.

2. The claw-pole motor in accordance with claim 1, wherein the stator rings provided at both ends along the axis have an identical form.

3. The claw-pole motor in accordance with claim 1, wherein the predetermined two of the stator rings are provided at both ends along the axis.

4. The claw-pole motor in accordance with claim 3, wherein the interval between the adjacent claw-shaped induction poles along the circumference of any adjacent stator rings is identical.

* * * * *

UNITED STATES PATENT AND TRADEMARK OFFICE
CERTIFICATE OF CORRECTION

PATENT NO.       : 7,608,972 B2                            Page 1 of 1
APPLICATION NO.  : 11/541525
DATED            : October 27, 2009
INVENTOR(S)      : Aoki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 432 days.

Signed and Sealed this

Twelfth Day of October, 2010

David J. Kappos
*Director of the United States Patent and Trademark Office*